(12) United States Patent
Fischer et al.

(10) Patent No.: US 8,820,218 B2
(45) Date of Patent: Sep. 2, 2014

(54) APPARATUS FOR AUTOMATICALLY DISSOLVING INSTANT POWDER, PARTICULARLY MILK POWDER, IN HOT WATER AND, IN PARTICULAR, FOR FROTHING-UP

(75) Inventors: Daniel Fischer, Romanshorn (CH); Christian Brendle, Amriswil (CH)

(73) Assignee: Eugster/Frismag AG, Romanshorn (CH)

( * ) Notice: Subject to any disclaimer, the term of this patent is extended or adjusted under 35 U.S.C. 154(b) by 200 days.

(21) Appl. No.: 11/805,719

(22) Filed: May 24, 2007

(65) Prior Publication Data

US 2008/0245239 A1    Oct. 9, 2008

(30) Foreign Application Priority Data

May 27, 2006   (DE) .................... 20 2006 008 409 U

(51) Int. Cl.
*A23C 9/00* (2006.01)
*A47J 31/40* (2006.01)
*A47J 43/12* (2006.01)

(52) U.S. Cl.
CPC ............... *A47J 31/401* (2013.01); *A47J 43/12* (2013.01)
USPC ........................................ 99/323.3; 99/323.1

(58) Field of Classification Search
USPC ................................. 99/302 C, 302 R, 289 R
See application file for complete search history.

(56) References Cited

U.S. PATENT DOCUMENTS

| | | | | |
|---|---|---|---|---|
| 2,601,943 A * | 7/1952 | Torrese | ........................ | 222/129.4 |
| 3,568,887 A * | 3/1971 | Jacobs et al. | .................. | 222/640 |
| 4,139,125 A | 2/1979 | Arzberger et al. | | |
| 4,485,816 A | 12/1984 | Krumme | | |
| 4,694,737 A * | 9/1987 | Wittlinger | ........................ | 99/279 |
| 5,007,333 A * | 4/1991 | Sager | ............................. | 99/286 |
| 5,392,978 A | 2/1995 | Velez et al. | | |
| 6,133,611 A | 10/2000 | Yamaguchi | | |
| 6,267,496 B1 * | 7/2001 | Real | ............................... | 366/132 |
| 6,360,650 B1 * | 3/2002 | Mangiapane | .................... | 99/291 |
| 6,405,637 B1 * | 6/2002 | Cai | ................................... | 99/293 |
| 6,561,079 B1 * | 5/2003 | Muller et al. | ................... | 99/282 |
| 6,758,130 B2 * | 7/2004 | Sargent et al. | .................. | 99/295 |
| 6,786,138 B2 * | 9/2004 | Johnson et al. | .............. | 99/323.1 |
| 6,832,542 B2 * | 12/2004 | Hu et al. | ...................... | 99/302 R |

(Continued)

FOREIGN PATENT DOCUMENTS

| | | |
|---|---|---|
| DE | 22 25 779 | 12/1972 |
| DE | 299 07 464 | 9/1999 |

(Continued)

OTHER PUBLICATIONS

U.S. Appl. No. 11/804,219, Boyden et al.

*Primary Examiner* — Thien S Tran
(74) *Attorney, Agent, or Firm* — DLA Piper LLP (US)

(57) ABSTRACT

Apparatus for automatically dissolving instant powder, particularly milk powder, in hot water and particularly for frothing up, including a flow generation device for generating a flow of the hot water impinging onto the instant powder with a circular component, wherein a frothing chamber (6) is provided into which opens a nozzle (10) tangentially directed to the internal wall (11*a*) of a frothing chamber (6), the nozzle (10) being connected with a hot water pressure duct (13), and the frothing chamber has a powder inlet opening (9) into which opens an inlet funnel (5), and in addition the frothing chamber (6) has an outlet opening (8).

14 Claims, 1 Drawing Sheet

(56) References Cited

U.S. PATENT DOCUMENTS

| | | | |
|---|---|---|---|
| 6,901,848 B2* | 6/2005 | Beretta | 99/453 |
| 7,335,387 B2* | 2/2008 | Hayes et al. | 426/433 |
| 7,350,457 B2* | 4/2008 | Wessels et al. | 99/323.1 |
| 7,455,011 B2* | 11/2008 | Brouwer et al. | 99/299 |
| 2002/0134248 A1* | 9/2002 | Eugster | 99/275 |
| 2004/0247757 A1* | 12/2004 | Wessels et al. | 426/490 |
| 2006/0000364 A1* | 1/2006 | Lau et al. | 99/295 |
| 2006/0283884 A1* | 12/2006 | Saggin et al. | 222/129.4 |
| 2007/0000944 A1* | 1/2007 | Cahen et al. | 222/108 |
| 2007/0079707 A1* | 4/2007 | Noordhuis et al. | 99/275 |
| 2007/0245902 A1* | 10/2007 | Frigeri et al. | 99/279 |
| 2008/0034977 A1* | 2/2008 | Halle et al. | 99/323.3 |
| 2008/0069930 A1* | 3/2008 | Wood et al. | 426/433 |
| 2008/0102178 A1* | 5/2008 | Thakur et al. | 426/511 |
| 2009/0011105 A1 | 1/2009 | Mahlich et al. | |
| 2009/0107342 A1* | 4/2009 | Piscaer et al. | 99/323.1 |

FOREIGN PATENT DOCUMENTS

| | | |
|---|---|---|
| EP | 0 009 270 | 4/1980 |
| EP | 0 843 983 | 5/1998 |
| GB | 1067684 | 5/1967 |
| WO | WO 02/087400 | 11/2002 |
| WO | WO 02/100224 | 12/2002 |
| WO | WO 03/070072 | 8/2003 |
| WO | WO 2004/017743 | 3/2004 |

* cited by examiner

APPARATUS FOR AUTOMATICALLY DISSOLVING INSTANT POWDER, PARTICULARLY MILK POWDER, IN HOT WATER AND, IN PARTICULAR, FOR FROTHING-UP

BACKGROUND OF THE INVENTION

The present invention relates to an apparatus for automatically dissolving instant powder, particularly milk powder, in hot water and, in particular, for frothing-up The instant powder to be dissolved is a nutrient or food stuff, particularly a milk powder or a cocoa mixture. Preferably, it should not only be dissolved but, by the inclusion of air, be additionally converted into milk froth. Under the term milk froth, one should understand such foam to be applied onto drinks, which consists of milk and/or includes milky constituents such as for instance the froth of cocoa-containing drinks.

The apparatus for automatically dissolving instant powder, particularly milk powder, is preferably an integral component of a coffee maker but may also be realized as an independent frothing-up device.

A milk froth generating apparatus for the generation of milk froth from milk powder and hot water earlier suggested by the Applicant comprises a rotationally symmetric hot water sprayer head which includes hot water channels downwardly directed and open at the lower ends (DE 10 2006 008 341.5 (U.S. application Ser. No. 11/708,954)). Some of the hot water channels open at the lower ends are disposed close to an outer convex surface of the hot water sprayer head and may be inclined about 2° to 12° relative to the perpendicular in peripheral direction. Contrary thereto, the hot water channels disposed close to the central axis of the hot water sprayer extend in parallel to the central axis. A hot water pressure generator and a water heater of the milk froth generating device earlier suggested may be realized in different ways. The hot water pressure generator and the water heater of a coffee machine may for instance be used in which the milk froth generating apparatus is integrated. The hot water pressure generator may be a water pump. However, it is also possible that the hot water pressure generator and the water heater are integrated within a water boiler according to the vapor pressure principle. In all those cases, the milk froth is being generated in a frothing vessel open on the top into which, in order to prepare milk froth, a portion each of milk powder is introduced. For milk froth generation, the hot water sprayer head is disposed at a certain distance above the milk powder so that the water jets emanating from the hot water sprayer head impinge approximately equally distributed onto the portion of milk powder in order to dissolve it and, under the inclusion of the air carried along by the water jets, to largely convert it to milk froth. The hot water sprayer head is in this case so adjusted that it is disposed above the froth being generated in order to keep free from it. Due to the formation of the hot water channels disposed close to the outer convex surface and inclined about 2° to 12° relative to the perpendicular, it results that the outer hot water jets emanate with a spin in peripheral direction of the hot water sprayer head, i.e. with a circular component, from it and impinge with a spin onto the milk powder which stimulates thorough mixing of the powder with the hot water and almost simultaneous frothing. A disadvantage may be, however, the required portionwise introduction of the milk powder into the frothing vessel through the upper opening thereof while the opening should preferably be spaced from the hot water sprayer head. That is why the hot water jets, particularly in case of partial clogging, may reach from the open space between the hot water sprayer head and the frothing vessel into the surrounding thereof, what can be disturbing.

BRIEF SUMMARY OF THE INVENTION

The object of the present invention is to provide an apparatus for automatically dissolving instant powder, particularly milk powder, in hot water, and in particular for frothing of the genus referred to in the beginning, which makes it possible to dissolve the instant powder not only portionwisely but continuously and, particularly, to froth it up and to make sure that the operation required is simple and safe.

This object is solved, for an apparatus for automatically dissolving instant powder, particularly milk powder, in hot water and in particular for frothing up, by the features of the present invention.

In such apparatus, the hot water used for dissolving the instant powder is injected in a state of high energy from the nozzle into the substantially closed frothing chamber while a hot water jet which may conduct air entrained from the air passage meets with the instant powder continuously apportioned. Advantageously, the rate of the powder supply can be correlated to the hot water jet supply so that the composition, or the consistency of the dissolved drink, or the froth, respectively, remains always the same. To this end, a coupling of the drive of the continuously conveying powder conveyer device, on one hand, and of the water pump, on the other, is provided in the present invention.

The hot water/air mixture entering the inner of the frothing chamber tangentially with high speed is brought into rapid rotation in the frothing chamber and escapes, therefore, partly through the powder inlet opening of the frothing chamber into the inlet funnel and can move upwards within it whereby a first thorough mixture of the rotating hot water air mixture with the added instant powder, particularly milk powder, is effected. When the resulting milk air mixture has lost sufficient rotational energy in the preferably progressively expanding inlet funnel, it sinks down, within the up-going hot water air mixture whirl, back into the frothing chamber wherein it is again brought into a more rapid rotation by the subsequently incoming hot water and froths up. As further hot water and milk powder are constantly flowing into the frothing chamber, or the inlet funnel, respectively, the mixing and frothing process proceeds continuously. The froth, particularly milk froth, thereby generated is pushed from the frothing chamber through the outlet opening.

The frothing chamber of the present invention is vertically arranged and provided with a cylindrical internal wall designed about a vertical middle axis; it comprises an upper cover wall including the powder inlet opening and a bottom including the outlet opening. The arrangement of the frothing chamber and of the inlet funnel is, therefore, constituted vertically one upon the other in extension of the vertical middle axis of the brewing chamber. Thereby, it can be achieved that in operation of the device the hot water air mixture will escape from the frothing chamber upwardly into the inlet funnel and, after thorough mixing with the instant powder, particularly milk powder, as described in the foregoing, can sink down by gravity into the frothing chamber. After a further mixing and frothing process in the frothing chamber, the froth generated leaves downwardly through the outlet opening. By means of this compact device, the milk powder is very intensively dissolved and frothed up in the hot water.

The froth may flow off through a discharge passage having the shape of a hollow cylinder which follows suitably, in the present invention, the outlet opening in downward direction.

It has shown to be of particular advantage if, at a lower section of the discharge passage, a centering rod centrically extends into it from below in order to calm down and to center the flowing-off of the froth, particularly the milk froth, into a receiving vessel below the discharge passage.

It is possible to prepare with the apparatus according to the present invention instead of froth, i.e. particularly milk froth, an ordinary hot drink, or milk, respectively, only from the dissolved instant powder or milk powder, respectively. To this end, only hot water but no air is fed through the jet into the frothing chamber. In order to perform this method of operation by a simple switch-over as an alternative to froth generation, it is provided that, in the present invention, a closable air passage opens into the hot water pressure duct upstream of the nozzle, from which air passage, when in its non-closed state, air is entrained into the how water duct. The closable air passage is suitably disposed close to a water inlet of the nozzle. As mentioned above, a continuously conveying powder conveyor device of the present invention is used for portioning the instant powder, particularly the milk powder, to be dissolved. According to the present invention, the conveyor may particularly suitably be designed as a worm conveyor. The worm conveyor allows precise continuous portioning.

In order to safeguard the described function of the frothing unit, i.e. the combination of frothing chamber with the inlet funnel, a free outlet area of the outlet opening on the bottom of the frothing chamber is smaller, in the present invention, than a free inlet area of the powder inlet opening at the lower end of the inlet funnel. Preferably, the area ratio of the free inlet area to the free outflow area amounts to about 4:1. In case of a circular free inlet area and a circular free outlet area, this corresponds to a diameter ratio of about 2:1. Therefrom results that the powder inlet opening should, in case of circular design, have a smaller diameter than the inner diameter of the cylindrically designed frothing chamber. Preferably, this ratio of the interior diameter of the frothing chamber relative to the diameter of the powder inlet opening amounts, in the present invention, to about 3:1.

The above quantitatively enumerated diameter ratios of powder inlet opening, of frothing chamber, and of outlet opening are selected depending on parameters such as powder processing rate, required hot water flow and water pressure, which means that depending on these parameters, they can be modified.

Preferably, the inlet funnel is, at least at the inside, rotationally-symmetrically designed about an essentially vertical middle axis, and clear cross sections of the inlet funnel expand progressively from the bottom to the top. Due to this design, the inlet funnel can be compact and efficient.

According to the present invention, the outlet opening suitably passes over, at the lower end at the frothing chamber, into a substantially vertical hollow-cylindrical discharge passage in which especially the dissolved milk and the milk froth emanating from the frothing chamber are calmed down and centered in order to flow into a receiving vessel which may be wide open on top and disposed below the outlet opening, or the discharge passage, respectively, without any spilling in the vicinity of the receiving vessel.

This effect is suitably supported, in the present invention, by a centering rod extending into a lower end of the outlet opening.

For economic production of a highly efficient apparatus, the inlet funnel and the powder inlet opening via which it passes over into the frothing chamber, the frothing chamber, its outlet opening, and the discharge passage are arranged about a common middle axis.

To operate the apparatus, the hot water pressure duct which is in connection with the nozzle is suitably connected with a continuous flow heater which can be fed via a water pump from a water container.

Instead, it may, however, also be of advantage to use the hot water pressure generator and the water heater of a coffee machine as the hot water pressure generator and water heater for the apparatus, when it serves as a milk froth generation device, in which case the hot water pressure duct of the milk froth generating device is connected with the water heater and the hot water pressure generator is disposed upstream of the water heater.

Particularly in the last-mentioned case, the hot water pressure generator may be a water pump.

Instead, it is however also possible that both the hot water pressure generator and the water heater are integrated in a water boiler according to the vapor pressure principle, which is connected with the hot water pressure duct of the apparatus for automatically dissolving instant powder, particularly milk powder, and for frothing up.

Particularly in that case when liquid pressure generation is performed by a pump, one drive each of the continuously conveying powder conveyer device and of the pump are preferably coupled, in the present invention, via a coupling, with each other. In this way, the rate of the powder to be dissolved, or to be frothed up, particularly of the milk powder, and the flow of the required hot water can be correlated as to the optimum amount ratios. The ratio of this powder rate and of the flow may be kept constant.

According to the present invention, the frothing unit comprising the frothing chamber including the nozzle, a water inlet into the nozzle, the discharge passage including the centering rod are advantageously designed as a throw-away article which can easily be replaced and connected with the hot water pressure duct into which the air passage leads in. Using a throw-away part makes careful cleaning unnecessary, a freshly to be used throw-away part is rather hygienically and physiologically in order. The throw-away part may be produced, in the present invention, with particular advantage uncomplicatedly from plastic material as one piece of light weight and thus at low cost.

An exemplified embodiment of the apparatus for automatically dissolving instant powder, particularly milk powder, in hot water for frothing up will be described in the following based on a drawing comprising two figures from which more precise details of the apparatus of the invention can be taken and wherein

DETAILED DESCRIPTION OF THE INVENTION

Figure 1:
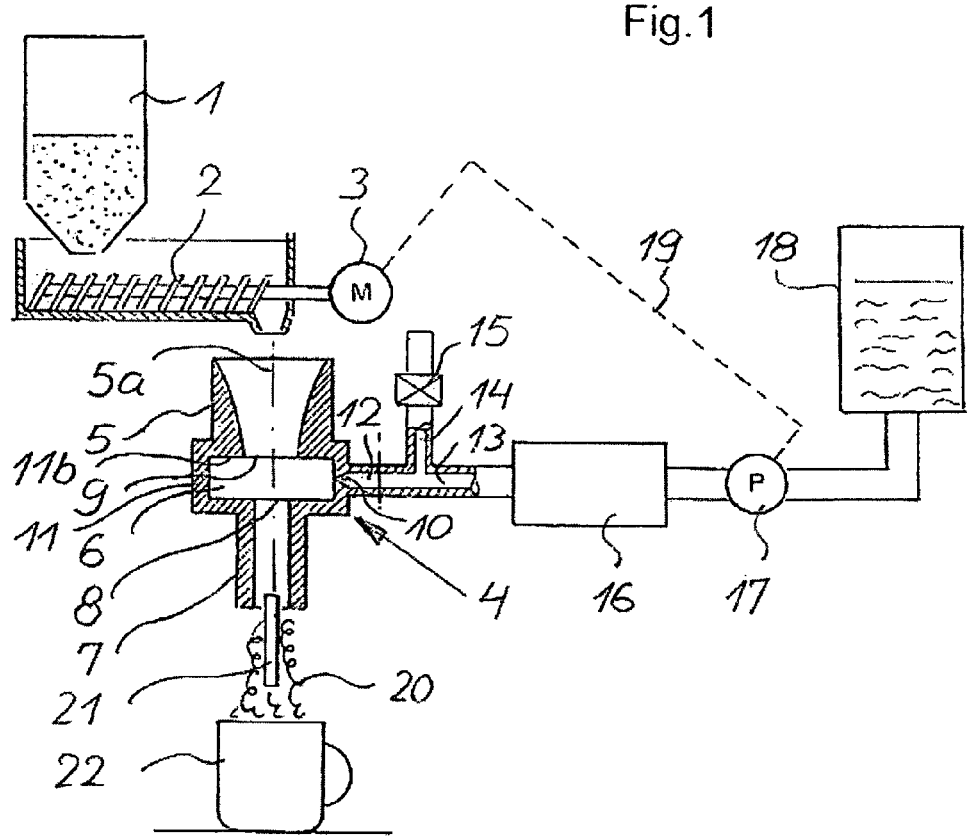
FIG. 1 is a diagrammatic representation of the apparatus comprising the respective components including frothing chamber and nozzle, for better understanding partly shifted in view of the actual arrangement and in cross section.

In FIG. 1, reference number 1 refers to a powder storage container below which a worm conveyor 2 is disposed as a continuous conveyor device. Driven by a worm conveyor drive 3 rotated by motor M, the latter conveys instant powder, particularly milk powder, to a frothing unit generally referred to by number 4.

The frothing unit substantially comprises an inlet funnel 5, below the inlet funnel a frothing chamber 6, and below the latter a discharge passage 7. These portions of the frothing unit are disposed one upon the other and substantially designed rotation-symmetrically as shown in the drawing, to constitute a virtual middle axis 5a.

Figure 2:
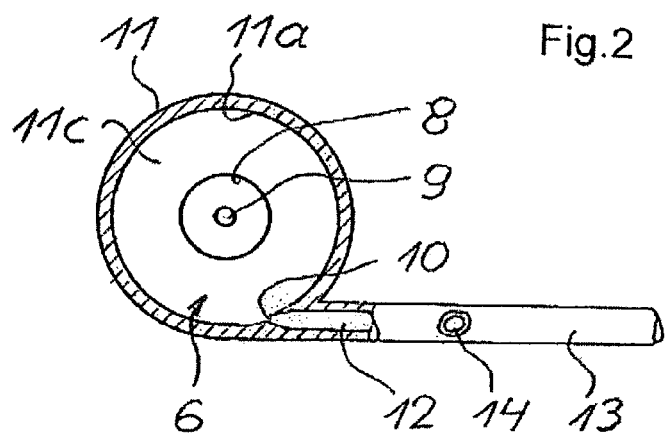
FIG. 2 is a horizontal central cross section through an essential element of the apparatus, i.e. the frothing chamber which is in the present case cylindrical including the tangential inlet of the nozzle.

More in detail, frothing chamber 6 is cylindrical inside as well as outside, see also FIG. 2, and the discharge passage 7 is cylindrical, too; it is shaped as a hollow cylinder having a smaller diameter and is in connection with the interior of frothing chamber 6 via a lower outlet opening 8 in its bottom 11c.

An upper cover wall 11b of frothing chamber 6 is perforated in the middle by a powder inlet opening 9 and passes via the latter into inlet funnel 5 disposed above it. The diameter of the circular powder inlet opening is smaller than the interior diameter of frothing chamber 6. Starting from powder inlet opening 9, the interior of inlet funnel 5 progressively expands upwards so that an interior wall, not designated, of the inlet funnel in the cross section depicted in FIG. 1 shows a parabolic shape.

The diameter ratios of the powder inlet opening, of outlet opening and of the frothing chamber depend on parameters such as the amount of instant powder to be processed per time unit, or the water amount per time unit and the water pressure. For amounts of milk froth common in the household and in the catering trade, it has shown to be of advantage to use a diameter ratio of powder inlet opening to outlet opening of about 2:1 and a ratio of the interior diameter of the frothing chamber to the diameter of the powder inlet opening of about 3:1.

A nozzle 10 extends into the frothing chamber 6. As can particularly be taken from FIG. 2, the nozzle 10 is disposed in the cylindrical wall 11 of the frothing chamber 6 so that the nozzle 10 terminates open tangentially relative to an interior wall 11a of the frothing chamber 6. The nozzle 10 is disposed at about half the height of cylindrical wall 11 of the frothing unit 4; compare FIG. 1.

A water inlet 12 of the nozzle 10 is in connection with a hot water pressure duct 13. Close to the water inlet 12, an air passage 14 enters into the hot water pressure duct 13; the air passage 14 is in connection with the ambient atmosphere if a closing valve 15 in the air passage 14 for froth generation, particularly milk froth generation, is open.

Both for frothing-up and for just preparing a drink of dissolved instant powder, particularly of milk, the hot water pressure duct 13 is connected via a continuous flow heater 16 and a water pump (P) 17, upstream of the continuous flow heater, with a water source 18, in the present case in the form of a water container. In order to coordinate the amount of powder to be transported by worm conveyor 2 with the water amount passed through hot water pressure duct 13, a non-designated drive of the water pump 17 is connected with worm conveyor drive 3 via a coupling 19 which is shown in FIG. 1 by a broken line and which can be realized by a connecting gear or common control means of the drives in order to safeguard an optimum amount ratio of the instant powder to the hot water flow.

For the generation particularly of milk froth, therefore, the pump 17 conveys a hot water conveying amount which is at a predetermined ratio to the continuous milk powder amount that is transported by the worm conveyor drive 3 to the frothing unit 4 and drops into the inlet funnel 5. The fresh water heated in the continuous flow heater 16 leaving it as hot water entrains, at the discharge location of the air passage 14 into the hot water pressure duct 13, air from the air passage after which the hot water air mixture so generated is injected by the nozzle 10 tangentially, inside, into the frothing chamber and is subsequently put into rapid rotation so that it partly escapes upwards into the inlet funnel 5 so that it mixes already in it with the milk powder falling into inlet funnel 5. The milk-air mixture so generated which in the inlet funnel 5 loses rotation energy, and can subsequently, in the up-going hot water whirl, sink back downwards into frothing chamber 6 where it is moved by the subsequently incoming hot water-air mixture introduced by the nozzle 10 into more rapid rotation again, mixes further with the milk powder, or the milk powder already dissolved, and froths up. Based on the continuously flowing hot water air mixture and the milk powder continuously conveyed into inlet funnel 5, milk froth 20 is generated in this way which flows off from the frothing chamber 6 through the outlet opening 8 downward through the discharge passage 7 while it is centered by a centering rod 21 which centrically extends partly into the discharge passage 7, and is finally caught in, and collected by, a receiving vessel 22 disposed below the frothing unit 4. From the receiving vessel 22, the milk froth may either be added, together with collected residual milk, to the coffee brewed for a cappuccino preparation or may flow directly into the cup. In this connection, it is of advantage that the residual milk formed in the frothing unit 4 still has approximately the temperature of the added hot water and will not, therefore, unduly cool the coffee down.

In order to dissolve the milk powder to obtain hot milk without froth, the closing valve 15 is closed, as mentioned, so that only hot water is injected in the frothing chamber 6 which, together with the inlet funnel 5 causes even intermixing of the hot water with the milk powder and the dissolution of it. This applies also in cases when instead of the milk powder a different instant powder is used.

In FIG. 1 it is indicated by means of a dash-dotted line in how far, and particularly suitably, the frothing unit 4 formed as a throw-away article reaches the hot water pressure duct 13 upon which is can be mounted by a few manipulations. The throw-away part is light in weight and shaped as one piece.

The invention claimed is:

1. Apparatus for automatically dissolving instant powder in hot water and comprising flow generation means for generating a flow of the hot water impinging onto said instant powder with a circular component, wherein
   a vertical frothing chamber is provided which includes a cylindrical interior wall into which opens a nozzle, said nozzle being connected with a hot water pressure duct,
   said vertical frothing chamber has an inlet opening into which opens an inlet funnel which is symmetrical, at the inside, about a vertical middle axis of the apparatus including the vertical frothing chamber,
   said vertical frothing chamber has a bottom including an outlet opening,
   said vertical frothing chamber comprises an upper horizontal cover wall including said inlet opening which is a powder inlet opening,
   the upper cover wall of the vertical frothing chamber arranged between the vertical frothing chamber and the inlet funnel passes smoothly via the powder inlet opening into the inlet funnel, which is disposed above the vertical frothing chamber,
   an interior wall of said inlet funnel expands outward in a parabolic shape starting at the powder inlet opening, and
   the powder inlet opening and the upper cover wall of the vertical frothing chamber are arranged in a same plane.

2. Apparatus according to claim 1, characterized in that above said inlet funnel a conveying powder conveyor device is disposed.

3. Apparatus according to claim 2, characterized by a worm conveyor is provided as said powder conveyor device.

4. Apparatus according to claim 1, characterized in that a free outflow area of said outlet opening is smaller than a free inflow area of said powder inlet opening.

5. Apparatus according to claim 4, characterized in that the area ratio of the free inflow area to the free outflow area amounts to about 4:1.

6. Apparatus according to claim 1, characterized in that said powder inlet opening is round and that the ratio of an interior diameter of said frothing chamber relative to the diameter of said powder inlet opening amounts to about 3:1.

7. Apparatus according to claim 1, characterized in that said outlet opening passes over into a vertical hollow-cylindrical discharge passage.

8. Apparatus according to claim 7, characterized in that a centering rod extends into a lower end of said discharge path.

9. Apparatus according to claim 1, characterized in that said inlet funnel together with said powder inlet opening of said frothing chamber, said frothing chamber, said outlet opening of said frothing chamber and a discharge passage are arranged about a common middle axis.

10. Apparatus according to claim 1, characterized in that a hot water pressure duct is connected to a continuous flow heater which is fed via a water pump.

11. Apparatus according to claim 2, characterized in that a single drive for each of said conveying powder conveying device and of a water pump is coupled to one another by a coupling means.

12. Apparatus according to claim 1, characterized in that a frothing unit comprising said frothing chamber including said nozzle, a water inlet into said nozzle and a discharge passage including a centering rod is designed as a throw-away part that is exchangeable and connected to a hot water pressure duct.

13. Apparatus according to claim 12, characterized in that said throw-away part is designed as one piece.

14. Apparatus according to claim 1, characterized in that that a closable air passage opens into the hot water pressure duct upstream of a water inlet of said nozzle for frothing up.

* * * * *